R. E. HELLMUND.
SYSTEM OF CONTROL.
APPLICATION FILED JAN. 16, 1917.

1,327,822.

Patented Jan. 13, 1920.
2 SHEETS—SHEET 1.

INVENTOR
Rudolf E. Hellmund.

R. E. HELLMUND.
SYSTEM OF CONTROL.
APPLICATION FILED JAN. 16, 1917.

1,327,822.

Patented Jan. 13, 1920.
2 SHEETS—SHEET 2.

WITNESSES:
Ed Plinke.
W. P. Coley

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,327,822.   Specification of Letters Patent.   Patented Jan. 13, 1920.

Application filed January 16, 1917. Serial No. 142,644.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to the combination of an electrical-braking system with a mechanical-braking system, such as the well-known air-brake.

The object of my invention is to provide a system of the above-indicated character wherein electrical braking, preferably of the regenerative type, shall be employed for retarding purposes to the fullest possible extent, thereby making for economy of operation, and wherein any additional braking power that is required and also the necessary retarding force, after the electrical-braking effort attains a relatively weak value, shall be automatically supplied by a suitable mechanical-braking system.

Other minor objects, involving the proper interlocking of the electrical and the mechanical-braking systems, will appear from the following specification.

Figure 1:
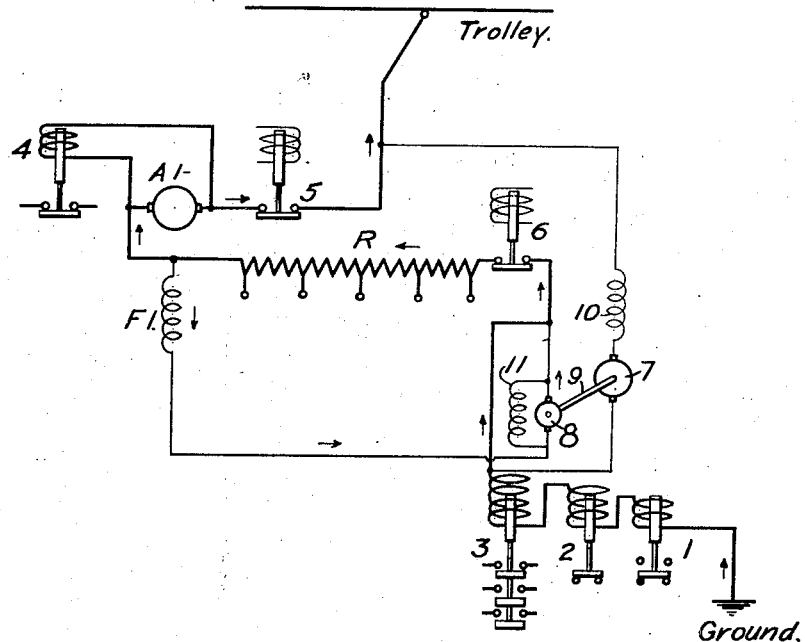
Figure 2:
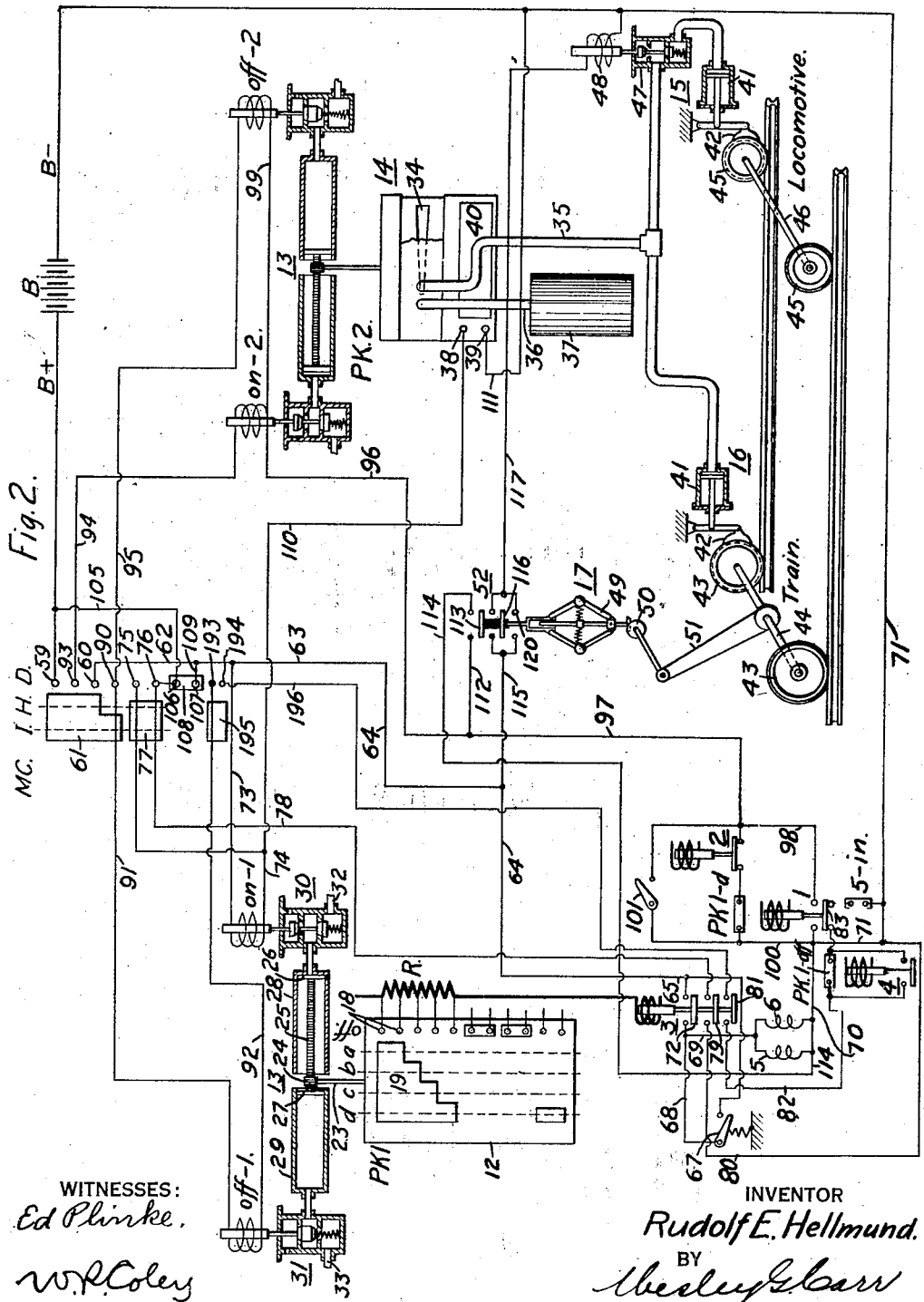

My invention may best be understood by reference to the accompanying drawings, wherein Figure 1 is a diagrammatic view of the main circuits of a system of control embodying my present invention; and Fig. 2 is a diagrammatic view of an auxiliary governing system for effecting both electrical and mechanical braking in connection with a locomotive and the train hauled thereby.

Referring to Fig. 1, the system shown comprises suitable supply-circuit conductors respectively marked "Trolley" and "Ground"; a main dynamo-electric machine having an armature A1 and a field winding F1 of the familiar series type; a variable resistor R that is connected in both the main-armature and main-field-winding circuits, as subsequently set forth in detail; a plurality of controlling relay devices 1, 2, 3 and 4; a plurality of main-circuit switches 5 and 6; and an auxiliary motor-generator set having its armatures respectively driven from the supply circuit and connected to excite the main field winding F1 under electrical braking conditions.

The relay devices 1, 2 and 3 are shown as connected in the main-machine or regenerative circuit and are thereby influenced directly in accordance with the value of the electric braking current but are adapted to operate at different settings or current values. The purpose of these current relay devices will be explained in connection with Fig. 2.

The other relay device 4 has its actuating coil connected across the main armature A1, thereby receiving the main-machine regenerated voltage for a purpose to be explained.

The illustrated motor-generator set or dynamotor comprises a driving or motor armature 7; a generator or exciting armature 8 which is mechanically associated with the driving armature 7 in any suitable manner, as by a shaft 9; a series field winding 10 for the driving armature 7; and a shunt field winding 11 for the exciting armature 8. It will be understood that any other suitable means for exciting the main field winding F1 during the regenerative period may be employed, if desired.

Inasmuch as the particular accelerating system or means for inaugurating regenerative operation is immaterial to my present invention, I deem it necessary to illustrate and describe the system in connection with only the relay devices and switches that are actually needed to set forth the principles of the invention. Those skilled in the art will readily be able to supply such additional switches, etc., as are necessary to replace the illustrated permanent connections.

Assuming that regenerative operation has been begun in any suitable manner, the switches 5 and 6 hence being closed, the main armature or regenerative circuit is established from ground through the actuating coils of the current relay devices 1, 2 and 3, the switch 6, the variable resistor R, the main armature A1 and the switch 5 and thence to the other supply-circuit conductor, Trolley.

The exciting circuit is established from one terminal of the auxiliary generator armature 8 through the switch 6, variable resistor R, and main field winding F1 to the other terminal of the auxiliary armature. The main field winding is thus supplied with energy from the exciting armature 8 alone, both the main-armature and the main-field-winding currents traversing the variable resistor R in the same direction, as indicated by the arrows.

No further exposition of the main control circuits is believed to be requisite, but a more complete explanation of this preferred type of main control system may be found in my co-pending application, Serial No. 44,443, filed August 9, 1915.

Referring now to Fig. 2, the system shown comprises an air-braking system 15 that is associated with the wheels of a locomotive, as indicated by the legend "Locomotive"; a corresponding air-brake system 16 that is connected to the wheels of the train hauled by the locomotive in question, as indicated by the inscription "Train"; an electrical-braking controller PK1 that is adapted to vary the active circuit value of the resistor R; a mechanical braking control device PK2 for governing, in this case, a familiar air-brake system in conjunction with the electrical-braking system, as hereinafter more fully set forth; a master controller MC that is adapted to occupy a normal position D, an intermediate operative position H and a final operative position I, standing for "Decrease," "Hold" and "Increase," respectively, reference being had to the retarding effect that is produced; the actuating coils of the main-circuit switches 5 and 6 and the various auxiliary contact members of the current relay devices 1 to 4, inclusive; and an auxiliary source of energy, such as a battery B, for suitably supplying energy to the auxiliary circuits in accordance with the position of the master controller MC.

The electrical-braking controller PK1 comprises a control drum 12 and an actuating mechanism 13 therefor, while the air-braking controller PK2 comprises an engineer's valve 14 that is provided with a similar actuating mechanism 13.

The control drum 12 embodies a plurality of suitable control fingers 18 that are respectively connected to appropriate points of the main-circuit resistor R and are adapted to be engaged by a contact segment 19 of suitable configuration for gradually short-circuiting the resistor R, as the control drum 12 successively assumes its operative positions $a$ to $d$, inclusive. Other auxiliary-circuit contact members are also located upon the control drum 12 for purposes to be described.

The actuating mechanism 13 is of a familiar electrically-controlled, pneumatically-operated type and comprises the operating shaft 23 of the control drum 12, to the upper end of which a pinion 24 is secured to suitably mesh with a horizontally-movable rack member 25, the opposite ends of which constitute pistons 26 and 27, which respectively travel within appropriate operating cylinders 28 and 29. A plurality of dissimilar valve members 30 and 31 are associated with the respective cylinders 28 and 29 to admit fluid pressure thereto through suitable pipes of passages 32 and 33 from any appropriate source (not shown), under conditions to be set forth. The valve members 30 and 31 are respectively provided with actuating coils On—1 and Off—1 for the purpose of reversing the positions of the respective valve members.

Assuming that the various parts of the actuating mechanism 13 occupy the illustrated positions, the operation thereof, without regard to the electrical connections effected thereby, may be set forth as follows: The valve member 31 is normally open to admit fluid pressure to the cylinder 29, thereby biasing the actuating mechanism and the control drum to the positions shown, since the other valve member 30 is normally closed to prevent the access of fluid pressure to the cylinder 28 and to connect that cylinder to the atmosphere. Upon the concurrent energization of the actuating coils On—1 and Off—1, the initial unbalanced conditions are reversed; that is, fluid pressure is admitted to the cylinder 28 and is exhausted from the cylinder 29, whereby movement of the control drum 12 toward its final operating position is effected.

To arrest such movement at any desired point, it is merely necessary to deënergize the Off—1 coil, whereupon balanced fluid-pressure conditions obtain in the two operating cylinders, and a positive and reliable stoppage of the apparatus is secured. To produce a return movement of the mechanism to the illustrated position, both actuating coils are concurrently deënergized, whereby fluid-pressure conditions in the mechanism revert to their original state, and the desired movement is effected.

Inasmuch as the actuating mechanism for the engineer's valve 14 is identical with that just described, although the direction of "forward" movement is shown as reversed, by reason of the fact that the desired operative movement of the valve is in the opposite direction from the operative movement of the control drum 12, no further description of the operating mechanism is thought to be necessary. For the purpose of distinguishing the various actuating coils, those for the operating mechanism that is associated with the engineer's valve 14 are respectively marked "On—2" and "Off—2."

The engineer's valve 14 may be of any suitable type for applying the air brakes in accordance with customary practice, and is shown developed into a single plane, for purposes of clearness, and as embodying a wedge-shaped slot 34 with which an outlet pipe or passage 35 is normally associated to communicate with the air brakes of the locomotive and of the train. Fluid pressure is admitted to the slot or opening 34, when the valve occupies an operative or braking position, from a pipe 36 that is associated with a suitable tank or reservoir 37. The valve member 14 is also provided with a plurality of auxiliary-circuit control fingers 38 and 39 which are adapted to be bridged by a contact segment 40 whenever the valve occupies any operative position, that is, any position other than that illustrated, for a purpose to be set forth.

The air-brake apparatus 15 is provided at any suitable number of points upon the train and comprises a brake cylinder 41 for supplying a suitable leverage to one or more brake shoes 42 that bear against the wheels 43 of the train, which wheels are mounted upon the customary axle 44.

In a similar manner, another brake cylinder 41 is associated with one or more brake shoes 42 for engaging the wheels 45 of the locomotive, which wheels are again joined by a suitable axle 46.

In the case of the locomotive, a valve member 47, that is controlled by an actuating coil 48, is normally closed to prevent the admission of fluid pressure from the outlet pipe 35 to the corresponding brake cylinder 41, whereas the brake cylinders for the train are directly connected to the outlet pipe 35. The purpose of this difference in the air-brake systems for the locomotive and the train will be evident from the well-known fact that, in the case of an electric locomotive that is retarding, through electric braking, a train of passenger coaches or freight cars, the application of air-brakes to the train proper will serve to increase the retardation of the entire series of vehicles, whereas the application of airbrakes to the locomotive, under regenerative braking conditions, serves to lessen the retarding effort thereof by decreasing the tractive effect of the locomotive wheels upon the rails. Consequently, in systems of the character under consideration, it may be desired, at times, to apply the air brakes to the train proper when the locomotive is regeneratively braking, whereas the locomotive air brakes should not be applied except when regenerative braking is no longer in force, and my present system embodies automatic means for effecting the desired functions.

In this connection, a centrifugal device 17, that is driven in accordance with the speed of the train, may conveniently be utilized. The centrifugal device 17 may be of any familiar type and is shown as comprising a linkage 49 that is mechanically driven through the agency of beveled gearing 50 and a belt 51 that is directly associated with the train wheel axle 44. A double contact-carrying member 52 is associated with the movable element of the linkage 49 for completing certain auxiliary circuits, under speed conditions to be set forth.

Assuming that it is desired to effect regeneration of the system, under suitable conditions, the master controller MC may be moved to its operative position H, whereupon a circuit is completed from the positive battery conductor B+ through control fingers 59 and 60, which are bridged by contact segment 61 of the master controller, conductors 62, 63, 64 and 65, an auxiliary starting switch 67, which is temporarily closed by the train operator and may be located in any convenient position, conductors 68 and 69, the parallel-related actuating coils of the switches 5 and 6 and conductors 70 and 71 to the negative battery conductor B—. The main-circuit switches 5 and 6 are thereby closed to complete the regenerative circuits that are illustrated in Fig. 1. As soon as regenerative current begins to flow, the current-relay devices 2 and 3 are lifted to their upper positions, while the relay device 1 remains in its lower position, being adapted to lift only under relatively heavy regenerated-current conditions, as subsequently described. Such upward actuation of the relay device 3 causes the auxiliary contact members 72 thereof to bridge the starting switch 67, which may thereupon be released, and the energization of the actuating coils of the main switches 5 and 6 is thenceforth dependent upon the position of the relay device 3, that is to say, upon the value of regenerated current.

A further circuit is completed at this time from the positively-energized conductor 62 through conductor 73, the actuating coil On—1 of the electrical-braking controller PK1, conductor 74, control fingers 75 and 76 which are bridged by contact member 77 of the master controller, conductor 78, coöperating contact members 79 of the relay device 3 in its upper or closed position and conductor 80 to the negative conductor 71.

Upon actuation of the master controller to its final or retardation-increasing position I, a new circuit is established from the contact segment 61 through conductor 91, the actuating coil Off—1 of the electric braking controller, conductor 92, control fingers 193 and 194 which are bridged by contact segment 195 of the master controller, conductor 196, coöperating contact members 81 of the relay device 3 in its upper position, conductor 82, contact member or interlock PK1—off of the control drum 12 in its illustrated position, coöperating contact members 83 of the current-relay device 1 in its lower position and interlock 5—in, which occupies the illustrated position upon the closure of the switch 5, in accordance with a familiar construction, to the negative conductor 71. Since both actuating coils of the electric braking controller are concurrently energized, movement of the controller toward its final operative position ensues, in accordance with the previously-recited operating principles, thereby gradually excluding the resistor R from circuit to compensate for the gradual decrease of vehicle speed. The rate of progress of such controller movement may be governed by suitable manual manipulation of the master controller MC, or by the use of the familiar limit switch for governing the energizing circuit of the actuating coil Off—1 and thereby arresting the main-controller movement under predetermined current conditions, in accordance with a familiar practice.

The electric braking controller PK1 will thus move forwardly until its final position $d$ is reached or until the maximum permissible electrical-braking effect, limited either by the slipping-point of the locomotive wheels or by the motor characteristics, has been attained; for example, when holding back a heavy train of cars on an appreciable grade. Under such relatively heavy regenerative-current conditions, the relay device 1 lifts, thereby interrupting the previously-traced circuit of the actuating coil Off—1 for the electric-braking controller to thus cause that controller to remain in whatever position it may occupy.

The lifting of the current-relay device 1 completes a new circuit from the contact segment 61 of the master controller through control finger 93, conductor 94, the actuating coil On—2 of the air-braking controller, conductors 96, 97 and 98 and the coöperating contact members 83 of the current-relay device 1 in its upper position, to the negative conductor 71.

A further circuit is completed, at this time, from the contact segment 61 of the master controller through control finger 90, conductor 95, the actuating coil Off—2 of the air-braking controller and conductor 99 to the conductor 96, whence circuit is completed as already traced.

Since both actuating coils of the air-braking controller PK2 are concurrently energized, forward movement of the controller to its braking positions ensues, whereby fluid pressure is admitted through the outlet pipe 35 to the brake cylinder 41 for the various cars of the train, but such fluid pressure is excluded from the locomotive brake cylinder by reason of the normal closure of the valve member 47. Such supplementary retarding effort as is necessary will thus be supplied to the train to maintain it at the desired braking speed, the electric braking effort being meanwhile retained at its maximum value. A further use of the electric braking system alone is made as soon as the necessity for the additional air-braking effect ceases, whereupon the current relay device 1 will drop to its illustrated lower position.

In brief, the mechanical-braking system is thus utilized only after the electrical braking effect has been employed to its full capacity.

After the electrical braking controller PK1 has reached its final position $d$ under normal braking conditions, the electrical retarding effect gradually weakens until the relay device 2 drops to its lower position. Thereupon, a new circuit is completed from the conductor 97 through the auxiliary contact members of the relay device 2, interlock or contact member PK1—$d$ and conductor 100 to the negative conductor 71. Thus, the energizing circuits for the actuating coils On—2 and Off—2 are again completed, and the air brake controller is again moved into an operative position.

In some cases, it may be advisable to provide an auxiliary manual means, preferably located near the master controller, for bridging the auxiliary contact members of the current-relay devices 1 and 2 whenever the train operator so desires, and this result may be conveniently accomplished by a switch 101 which is shown as directly connecting conductors 97 and 100.

After the application of the airbrakes by the dropping of the current-relay device 2, as just recited, the regenerative current rapidly decreases to a very low value, corresponding to the setting of the current-relay device 3, which thereupon drops to its lower position and thus opens the previously-traced circuits of the actuating coils for the main-circuit switches 5 and 6 and also for the actuating coils On—1 and Off—1 of the electrical-braking controller. In this way, the electrical-braking effect is automatically discontinued by the opening of the main-circuit switches, while the electrical-braking controller is returned to its illustrated off position.

If the train operator subsequently attempts to recommence regeneration by closing the starting switch 67 while the master controller occupies its operative position I, the electrical-braking controller PK1 will move to its initial operative position $a$, but is halted in such position unless the regenerated voltage is sufficient to properly effect regeneration. Such a result is accomplished by the connection of the auxiliary contact members of the voltage-relay device 4 in parallel relation to the contact member PK1—off that is included in the previously-traced circuit of the actuating coil Off—1 for the electrical-braking controller. Thus, further movement of the electrical-breaking controller is prevented as soon as the controller reaches its initial operative position $a$, unless the voltage-relay device 4 has lifted to its upper position. In this way, regeneration may again be resumed after a cessation thereof, provided the train strikes a down grade and increases in speed to a point sufficient to generate the requisite main-armature voltage.

Whenever it is desired to decrease the braking effect during the time that both the electrical-braking and the air-braking controllers are in use, in accordance with the previously-described operation; for example, when traveling upon a more nearly level grade after passing down a relative steep incline which tended to cause the locomotive wheels to slip, such decrease in the retarding effected may be effected by merely moving the master controller to its off position D. Under such circumstances, the air-braking controller will move toward and occupy its inoperative or off position before the electrical-breaking controller is actuated at all, thereby again utilizing the full electrical-breaking effect and employing the mechanical-breaking system to as small a degree as possible.

Such relative-time operation of the air-braking and electrical-braking controllers is effected by the establishment of a new circuit, when the master controller occupies its off position, from the positive battery conductor B+ through conductor 105, control fingers 106 and 107, which are bridged by contact segment 108 of the master controller, conductors 109, 62 and 73, the actuating coil On—1, conductors 74 and 110, control fingers 38 and 39, which are bridged by contact member 40 of the air-braking controller PK2 in any operative position thereof, and conductor 111 to the battery conductor B—. Consequently, the energization of the circuit of the actuating coil On—1 for the electrical-braking controller PK1 is maintained until the air-breaking controller reaches its off position, whereupon the circuit in question is deënergized to allow the return of the electrical-breaking controller to its off position.

In addition to the foregoing arrangement, it may be desirable to provide means for automatically setting the air-brakes on all of the cars and also on the locomotive under certain emergency conditions, such as dangerously high speed caused by the failure of the electrical-braking system, and also when the speed has decreased to such a low value that air brakes alone may be employed to bring the complete train to a stand-still.

Under the above-mentioned dangerously high-speed conditions, the centrifugal device 17 raises the contact-carrying member 52 to its uppermost position, whereby one circuit is completed from the conductor 96 through conductor 112, coöperating contact members 113 of the centrifugal device 17 and conductor 114 to the negatively-energized conductor 70. Thus, the previously-described circuit for the actuating coils of the air-breaking controller are completed to automatically effect the application of the air-brakes. A further circuit is completed at this time from the positively-energized conductor 63 through conductor 115, coöperating contact members 116 of the centrifugal device 17, conductor 117 and the actuating coil 48 for the locomotive valve 47 to the negative battery conductor B—. In this way, the valve 47 is opened to admit fluid pressure from the outlet pipe 35 to the locomotive brake cylinder 41, thus effecting an application of the locomotive air brakes.

Under the above-recited relatively low vehicle-speed conditions at the end of the braking period, the centrifugal device 17 lowers the contact-carrying member 52 to a predetermined position, wherein the conductors 115 and 117 are again connected through the agency of the movable contact member 116 of the centrifugal device which bridges a pair of stationary contact members 120, thereby again producing the desired automatic application of the locomotive airbrake.

It will be understood that if desired, separate controllers or operating handles, respectively corresponding to the electrical-braking controller and the air-braking controller, may be employed in lieu of the single master controller MC that is herein illustrated.

Under such circumstances, however, the two controllers may be readily interlocked, either mechanically or electrically, to perform similar relative functions to those previously recited.

I do not wish to be restricted to the specific circuit connections or arrangements of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with an electrical-braking dynamo-electric machine, of an additional braking system, and means dependent upon a relatively high value of regenerated current for rendering said braking system operative.

2. In a system of control, the combination with an electrical-braking dynamo-electric machine, of an additional braking system, and means for automatically rendering said braking system operative only after the maximum permissible electrical-braking effect has been utilized.

3. In a system of control, the combination with an electrical-braking dynamo-electric machine, of a mechanical-braking system, and a relay device energized in accordance with electrical-braking conditions for effecting the operation of said braking system only after the maximum permissible electrical-braking effect has been utilized.

4. In a system of control, the combination with an electrical-braking dynamo-electric machine, of a mechanical-braking system, and means for permitting the automatic operation thereof only beyond certain maximum and minimum electrical-braking efforts.

5. In a system of control for an electric vehicle, the combination with an electrical-braking dynamo-electric machine, of a mechanical-braking system, means for electrically supplying the required breaking effect within predetermined limits, and means mechanically controlled in accordance with the speed of the vehicle for automatically effecting the use of the mechanical-braking system beyond said limits.

6. In a system of control, the combination with an electrical-braking dynamo-electric machine, of a pneumatically-operated braking system, a single manual means for governing both the electrical and the pneumatic-braking systems and means for selectively operating either system or both systems under various predetermined conditions.

7. In a system of control, the combination with an electrical-braking dynamo-electric machine, of a pneumatically-operated braking system, a single means for manually governing both the electrical and the pneumatic-braking systems, and relay devices energized by predetermined braking-circuit conditions for selectively effecting the operation of either system or both systems.

8. In a system of control for an electric vehicle, the combination with an electrical-braking dynamo-electric machine, of a mechanical-braking system, a single means for manually governing both the electrical and the mechanical braking systems, and relay devices for effecting the utilization of the electrical-braking system to provide the required braking effect within predetermined limits and means mechanically controlled in accordance with the vehicle speed for automatically effecting the use of the mechanical-braking system beyond said limits.

9. In a system of control, the combination with an electrical-braking dynamo-electric machine, of a mechanical-braking system, means for concurrently operating both braking systems under predetermined conditions, and means inherent in the system for eliminating the mechanical-braking effect prior to any reduction of electrical-braking effect.

10. In a system of control, the combination with an electrical-braking dynamo-electric machine, of a mechanical-braking system, means for concurrently operating both braking systems under relatively heavy braking conditions, and means inherent in the system for subsequently reducing the braking effect under lessened requirements by eliminating the mechanical-braking effect prior to any reduction of electrical-braking effect.

11. In a system of control, the combination with an electrical-braking dynamo-electric machine, of a mechanical-braking system, a relay device for rendering said braking system operative under predetermined relatively heavy braking-current conditions, and a second relay device for performing a similar function under predetermined relatively light braking-current conditions.

12. In a system of control, the combination with an electrical-braking dynamo-electric machine, of a mechanical-braking system, a relay device for rendering said braking system operative under predetermined relatively heavy braking-current conditions, a controller for governing the electrical-braking circuits, and a second relay device for rendering said braking system operative under predetermined relatively light braking-current conditions, provided said controller occupies its final position.

13. In a system of control, the combination with an electrical-braking dynamo-electric machine, of a mechanical-braking system, a relay device for rendering said braking system operative under predetermined relatively heavy braking-current conditions, a second relay device for performing a similar function under predetermined relatively light braking-current conditions, and a third relay device for subsequently effecting the interuption of the braking circuits.

14. In a system of control, the combination with an electrical-braking dynamo-electric machine, of a mechanical braking system, a relay device for rendering said braking system operative under predetermined relatively heavy braking-current conditions, a second relay device for performing a similar function under predetermined relatively light braking-current conditions, a third relay device for subsequently effecting the interruption of the braking circuits, and a fourth relay device for permitting certain operation of the braking circuits only under suitable voltage-generating conditions of the main-machine armature.

15. In a system of control, the combination with an electrical-braking dynamo-electric machine, of a mechanical-braking system, a relay device for rendering said braking system operative concurrently with electrical braking under predetermined relatively heavy braking-current conditions, a movable governing device for said braking system, and means movable with said device for permitting a subsequent decrease of the breaking effect under lessened requirements by eliminating the mechanical braking effect prior to any reduction of electrical braking effect.

16. In a system of control, the combination with an electrical-braking dynamo-electric machine, of a mechanical-braking system, an electrically-governed controlling device for each braking system, a relay device for rendering said braking system operative concurrently with electrical braking under predetermined relatively heavy braking-current conditions, and means carried by the mechanical braking controller and interposed in the governing circuit of the electrical-braking controller for permitting a subsequent decrease of the braking effect under lessened requirements by eliminating the mechanical-breaking effect prior to any reduction of electrical-braking effect.

In testimony whereof, I have hereunto subscribed my name this 30th day of Dec., 1916.

RUDOLF E. HELLMUND.